April 3, 1962  E. J. GALLAGHER, JR  3,027,680

TABLE LEG LENGTH EQUALIZER

Filed Dec. 17, 1958

INVENTOR.
EDWARD J. GALLAGHER, jr.
BY
*Victor J. Evans & Co.*
ATTORNEYS

United States Patent Office 3,027,680
Patented Apr. 3, 1962

3,027,680
TABLE LEG LENGTH EQUALIZER
Edward J. Gallagher, Jr., Baltimore, Md., assignor to
The E. J. Gallagher, Jr., Patent Devices Company
Filed Dec. 17, 1958, Ser. No. 781,041
4 Claims. (Cl. 45—139)

This invention relates to a leveler and stabilizer as used particularly for legs of tables, chairs, and other furniture, and also for machines and other equipment to prevent rocking or vibration, and in particular a plunger, piston or shaft slidably mounted in a sleeve in a counterbore in the end of a leg of an article of furniture or the like, or attached to the end of the leg for leveling or stabilizing an object or for absorbing or eliminating vibrations therein, in which outward movement of the plunger is limited by a screw or shaft extended through the plunger and sleeve and secured in the leg in or on which the sleeve is positioned, the device providing a leveler or stabilizer for use on any object on a plane surface, such as a floor, ceiling, or wall, and the device may also be used in ships, airplanes, railway equipment, or motor vehicles. In this improved design the parts are enclosed so that the mechanical elements are protected from water, grease, detergents, or other foreign matter.

In numerous instances, such as tables in restaurants, one leg seems shorter than the other, resulting in the table rocking, whereas with the spring loaded plungers in the legs, the table will be stabilized and the rocking eliminated.

The purpose of this invention is to provide means for mounting a spring in the lower end of a leg of a table, or other device whereby the weight of the table is taken by a spring in combination with air locked or compressed above a plunger slidably mounted in the lower end of a table leg or the like whereby the surface of the table remains level and stabilized with no rocking under all conditions.

Various types of plungers, bearings, and other devices have been provided in lower ends of table and chair legs to prevent sliding on slippery floors and also to facilitate leveling the upper surfaces of tables, desks, and other articles of furniture and although such devices are satisfactory under conditions where tables remain in fixed positions they do not permit moving the table from one position to another where high or low areas in surfaces of floors may be encountered. With this thought in mind this invention contemplates a plunger adjustably mounted in the lower end of a leg of an article of furniture or the like wherein the combination of a spring with compressed air locked above the plunger retains the upper surface of the article of furniture level and stabilized under all conditions.

The object of this invention is, therefore, to provide means for resiliently mounting a plunger in a sleeve inserted in the lower end of a leg of an article of furniture whereby the weight of the article of furniture is taken by the resilient means.

Another object of the invention is to provide a leveling plunger for use in lower ends of legs of tables and other articles of furniture and the like in which the plunger may be installed in legs of furniture now in use.

Another important object of the invention is to provide a leveling plunger for use in lower ends of legs of tables and other articles of furniture in which the load such as the weight of the table or articles positioned on the table is taken by a spring in combination with air locked in an area above the plunger.

A further object of the invention is to provide a self adjusting plunger for use in lower ends of legs of tables and the like for maintaining upper surfaces of the tables level and stabilized and in which the plunger is of a simple and economical construction.

With these and other objects and advantages in view the invention embodies a sleeve having an annular flange extended outwardly from one end and an opening in the opposite or closed end, a plunger slidably mounted in the sleeve and extended from the flanged end thereof, a screw extended through the plunger and sleeve and having a threaded end extended beyond the closed end of the sleeve, a spring positioned around the screw and between the plunger and closed end of the sleeve, a sealing washer with a stiffening rib in one side to tilt the plunger in an inclined plane in the sleeve, and a plug threaded in the lower end of the plunger providing access to the head of the screw.

Other features and advantages of the invention will appear from the following description taken in connection with the drawing, wherein.

Figure 1:
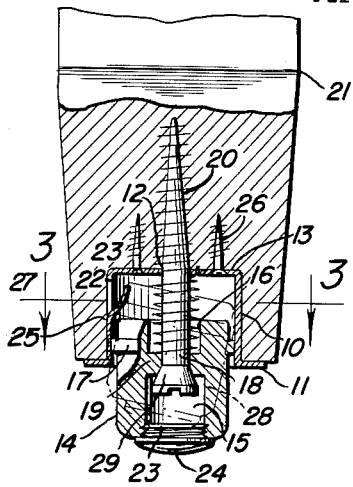
FIGURE 1 is a vertical section through a leveling plunger mounting in the lower end of a table leg showing the plunger in an extended position in full lines and in an inclined plane or tilted position in broken lines.

Referring now to the drawing wherein like reference characters denote corresponding parts the improved resilient mounting of a plunger in the lower end of a leg of a table, desk, or other article of furniture, and particularly as illustrated in FIGURE 1, includes a sleeve 10 having a flange 11 on the lower end and an opening 12 in the closed upper end 13, a plunger 14 slidably mounted in the sleeve 10 and having a counterbore 15 in the lower end, a similar counterbore 16 in the upper end and an annular rib 17 positioned on the outer surface and formed to slide vertically in the sleeve 10, a screw or shaft 18 extended through a partition 19 in the intermediate part of the plunger 14 and having a threaded end 20 extended for threading into the lower end of a leg 21 of a table or other article of furniture, or the like, a spring 22 extended around the shaft, screw, or fastener and positioned with the lower end in the counterbore 16 in the upper end of the plunger and with the upper end bearing against the under surface of the closed end 13 of the sleeve 10, and a plug 23 threaded in the lower end of the counterbore 15 of the plunger 14 and having a recess 24 for an Allen head screwdriver, or with flat sides for a screwdriver, or the like.

The sleeve 10 is retained in a counterbore 25 in the lower end of a table leg 21 by screws 26 extended through the closed end 13 of the sleeve and the inner portion of the sleeve is provided with a finger 27 that is positioned to be engaged by the inner end of the plunger 14 as the plunger is forced inwardly by load on a table or the like whereby the plunger assumes an inclined position, as indicated by the dotted lines 28.

Outward movement of the plunger 14 is limited by engagement of the partition 19 of the plunger with the head 29 of the screw or shaft 18 and by adjusting the position of the screw the outward movement of the plunger may be regulated.

Figure 8:
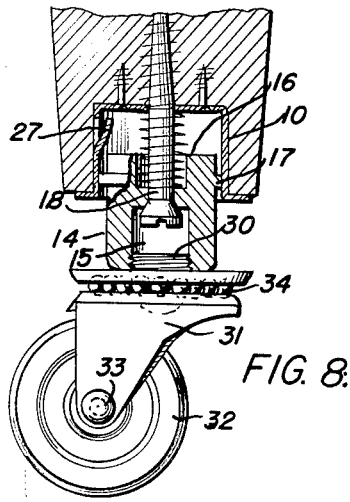
FIGURE 8 is a vertical section similar to that shown in FIGURE 1 showing a ball bearing caster mounted in the lower end of the plunger.
Figure 3:
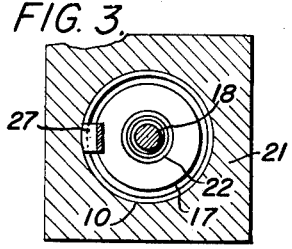
FIGURE 3 is a sectional plan taken on line 3—3 of FIGURE 1 showing the upper portion of the plunger.
Figure 9:
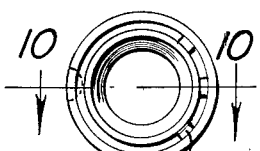
FIGURE 9 is a plan view of the resilient washer, showing reinforcing ribs thereon.

In the design illustrated in FIGURE 8, the sleeve, plunger, screw and spring are similar to corresponding parts illustrated in FIGURE 1, however, the plug 23 is replaced by a plug 30 of a caster 31 having a roller 32 mounted on a pin 33 and having a ball bearing 34 in the upper end.

Figure 4:
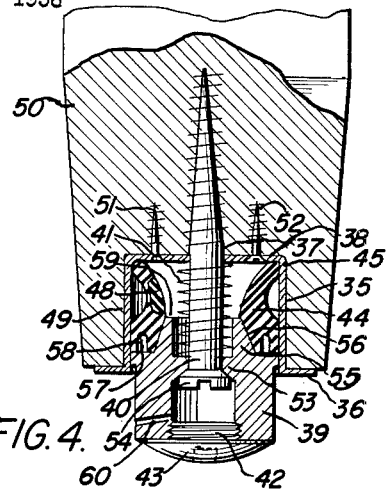
FIGURE 4 is a vertical section similar to that shown in FIGURE 1 illustrating a modification wherein a resilient sealing washer is provided between the inner portion of a plunger slidably mounted in a sleeve in a table leg and the inner end of the sleeve, and showing in particular a stiffening element embedded in the washer.
Figure 2:
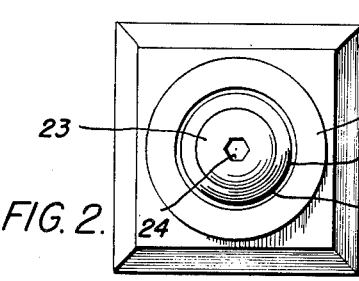
FIGURE 2 is a view looking upwardly toward the lower end of the plunger and table leg shown in FIGURE 1.

In the design illustrated in FIGURE 4 the device includes a sleeve 35 having a flange 36 on the lower end and having an opening 37 in the closed upper end 38, a plunger 39 somewhat similar to the plunger 14, a screw or shaft 40, somewhat similar to the screw 18, a spring 41, similar to the spring 22, a plug 42 having a head 43, and a resilient washer 44 having a rim 45 at the upper end, a collar 46 with teeth 47 extended therefrom on the lower end and a stiffening rib 48 incorporated in the intermediate part.

The sleeve 35 is retained in a counterbore 49 of a leg 50 of a table, or the like, by screws 51 and 52 and outward movement of the plunger 39 is limited by engagement of a partition 53 of the plunger with a head 54 of the screw.

The inner end of the plunger 39 is provided with a frustro-conical shaped section 55, the outer surface of which nests in a similar surface 56 of the rubber air seal washer 44 and a shoulder 57 of the plunger is provided with teeth 58 that mesh with corresponding teeth 47 on the lower end of the washer 44. The inner end of the plunger 39 is also provided with a counterbore 59 in which the lower end of the spring 41 is positioned.

With the parts assembled as illustrated and described the washer 44 provides a seal providing air locked compression above the plunger in the sleeve whereby the weight of a table or the like is taken by compression of the spring and also by compression of air in the sleeve 35 and positioned above the upper end of the plunger 39.

The position of the plunger is adjustable by removing the plugs 23 or 42 whereby the screws retaining the plunger in position on the legs of tables or the like are adjustable to compensate for uneven floor surfaces. After the plungers are accurately adjusted the plugs 23 or 42 are replaced.

The lower end of the plunger may be provided with a drain opening 60, as illustrated in FIGURE 4 whereby condensation, or the like may be drained from the interior of the plunger.

The outer surface of the arcuate intermediate portion of the washer 44 is provided with reinforcing ribs 61 to cause the washer to compress more on one side than on the other whereby the plunger assumes an inclined plane.

Figure 11:
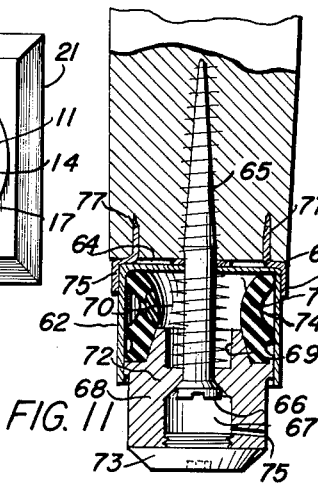
FIGURE 11 is a view showing a modification wherein instead of being mounted in a counterbore in the lower end of a leg of a table or the like the sleeve or housing is positioned against the lower end of the leg with the mounting screw or shaft extended upwardly into the leg.
Figure 5:
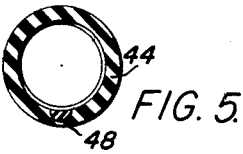
FIGURE 5 is a sectional plan through the rubber seal washer shown in FIGURE 4 also showing the stiffening element therein.
Figure 6:
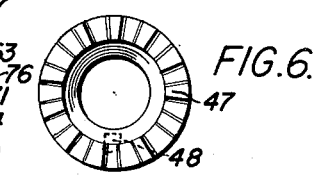
FIGURE 6 is a view looking upwardly toward the lower end of the resilient washer showing teeth in the lower surface thereof.
Figure 10:
FIGURE 10 is a cross section through the washer shown in FIGURE 9, being taken on line 10—10 thereof.
Figure 7:
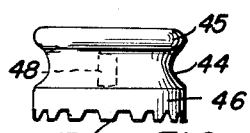
FIGURE 7 is a side elevational view of the resilient washer shown in FIGURE 4 with the stiffening element shown in dotted lines therein.

In the design illustrated in FIGURE 11, a sleeve 52 having a washer 63 at the upper end is positioned against a lower end 64 of a table leg with a screw 65 threaded upwardly into the leg and the head 66 of the screw is positioned in a counterbore 67 of a plunger 68 which is slidably mounted in the sleeve 62.

The plunger 68 is provided with a counterbore 69, in the inner end in which the lower end of a spring 70 is positioned, the upper end of the spring bearing against the inner surface of the end wall 71 of the sleeve 62. The plunger 68 is provided with an intermediate horizontally disposed partition 72 through which the screw 65 extends and the lower end of the plunger is provided with a plug 73. A resilient air seal washer 74, similar to the air seal washer 44 is provided in the housing or sleeve 62 to coact with the spring 70 and also to seal the area in the sleeve above the plunger 68 to provide a compressed air cushion. The plunger 68 is also provided with a drain opening 75, as shown.

The resilient mounting for a plunger, or piston in the lower end of the leg of a table or the like provides a pneumatic or air compression seal which stabilizes the elements causing an object in the ends of the legs of which the parts are mounted to seek a level position.

The rubber air seal washer 63 may be formed with a slight rim or the rim may be extended to form a flange 76, to extend around the sleeve 62.

The washer may also be provided with prongs 77 that are driven upwardly into the lower end of the table leg.

By this means a leveler or stabilizer is provided which, as a result of the stiffening element 48 or the finger 27 tilts as it is pressed inwardly whereby the plunger is locked by an inclined plane or tilting of the plunger. The stiffening element, finger and annular flange or rib around the plunger cause the plunger to sit at an angle at all times with even a slight load on the article of furniture and with this tilting action in combination with the air seal washer air is locked in the mounting and all vibration and rocking actions are eliminated.

It will be understood that other modifications, within the scope of the appended claims, may be made in the design and arrangement of the parts without departing from the spirit of the invention.

What is claimed is:

1. In a resilient mounting for use in the lower end of a leg of an article of furniture or any object, the combination which comprises a sleeve having an outwardly disposed annular flange extending from one end and an opening in the opposite or closed end, a plunger having an annular rib on the outer surface slidably mounted in the sleeve and having counterbores in both ends, a screw extending through the plunger and sleeve and having the threaded end extended to be threaded into the lower portion of the leg, outward movement of the plunger being limited by the head of the screw, a spring extended around the screw and positioned between the plunger and inner end of the sleeve, and a plug threaded in the outer end of the plunger and providing a cover for the head of the screw.

2. In a stabilizer mounting for use in the lower end of a table leg having a counterbore therein, the combination which comprises a sleeve positioned in the counterbore in the lower end of the leg of the table, a plug having counterbores in its ends, an annular rib on the outer surface of said plug slidably mounted in said sleeve, a screw extended through the plunger and sleeve and having a threaded end positioned to be threaded into the lower portion of the leg of the table, the head of the screw being positioned in the counterbore in the outer end of the plunger, a plug threaded in the outer end of the counterbore providing a cover for the head of the screw, a spring extended around the screw and positioned between the plunger and inner end of the sleeve, the lower end of the spring extending into the counterbore in the inner end of the plug, a washer of resilient material also positioned between the inner end of the plunger and the inner end of the sleeve, the washer providing a seal locking air in the sleeve to provide an air cushion for stabilizing objects, and means for tilting the plunger as it is moved inwardly.

3. A resilient mounting for a leg of a table or other article of furniture or device comprising a sleeve, plunger, or piston slidably mounted in the sleeve and having a counterbore in the outer end, a shaft extended through the plunger or piston, through the inner end of the sleeve and positioned with a head thereof in the counterbore of the plunger or piston, a sealing washer in the sleeve and positioned between the plunger or piston and inner end of the sleeve, and a spring extended around the shaft and also positioned between the plunger or piston and inner end of the sleeve.

4. In a leveler for furniture and other objects, the combination which comprises a sleeve, a plunger having a counterbore in each end slidably mounted in the sleeve, a shaft extended through the plunger and sleeve and having an end extended from the sleeve, a head of the shaft being positioned in the counterbore in the outer end of the plunger, a plug threaded in the outer end of the plunger, a spring extended around the shaft and positioned with one end in the counterbore in the inner end of the plunger and with the other end bearing against the inner end of the sleeve, and a washer of resilient material in the sleeve and positioned with one end in engagement with the plunge rand with the opposite end in engagement with the inner end of the sleeve.

References Cited in the file of this patent

UNITED STATES PATENTS

| | | |
|---|---|---|
| 1,898,465 | Peters | Feb. 21, 1933 |
| 2,054,977 | Hervey | Sept. 22, 1936 |
| 2,055,715 | Barker | Sept. 29, 1936 |
| 2,176,255 | Frost | Oct. 17, 1939 |
| 2,476,381 | Peavey | July 19, 1949 |
| 2,775,849 | Ingram | Jan. 1, 1957 |
| 2,795,892 | Lautenbacher et al. | June 18, 1957 |
| 2,871,616 | Sundell | Feb. 3, 1959 |